United States Patent [19]

Wagenbach et al.

[11] Patent Number: 4,774,627

[45] Date of Patent: Sep. 27, 1988

[54] METAL-ENCAPSULATED SWITCHING APPARATUS

[75] Inventors: Wolfgang Wagenbach, Birstein; Heinrich Neumaier, Hanau; Heinrich Probst, Blankenbach; Theo Peitz, Hanau; Paul Westbrock, Laudenbach, all of Fed. Rep. of Germany

[73] Assignee: BBC Aktiengesellschaft, Brown, Boveri & Cie, Baden, Switzerland

[21] Appl. No.: 24,836

[22] Filed: Mar. 12, 1987

[30] Foreign Application Priority Data

Mar. 14, 1986 [DE] Fed. Rep. of Germany ....... 3608482

[51] Int. Cl.$^4$ ............................................. H02B 13/00
[52] U.S. Cl. ................................ 361/335; 200/148 R; 200/148 B; 361/333
[58] Field of Search ..................... 200/148 F, 148 B; 361/333, 335

[56] References Cited

U.S. PATENT DOCUMENTS

| 4,527,220 | 7/1985 | Boersma et al. | 361/333 |
| 4,644,442 | 2/1987 | Ponsioen et al. | 361/335 |
| 4,658,329 | 4/1987 | Kamura et al. | 361/333 |
| 4,678,876 | 7/1987 | Westbrock et al. | 200/148 B |

FOREIGN PATENT DOCUMENTS

| 0462925 | 11/1968 | Switzerland | 200/148 B |
| 0548306 | 10/1942 | United Kingdom | 361/335 |
| 0548307 | 10/1942 | United Kingdom | 361/335 |

Primary Examiner—A. D. Pellinen
Assistant Examiner—Gregory D. Thompson
Attorney, Agent, or Firm—Herbert L. Lerner; Laurence A. Greenberg

[57] ABSTRACT

A metal-encapsulated switching apparatus includes a housing having first and second opposite ends, a first insulator disposed at the first end and a second insulator disposed at the second end. First terminals are supported on the first insulator. First phase conductors run in a given direction and are connected to the first terminals. Second terminals are supported on the second insulator. Second phase conductors run in the given direction and are connected to the second terminals. The first and second terminals are mutually parallel, spaced apart and mutually overlapped. Movable contacts in the form of contact blades are supported on the first terminals. Fixed contacts are supported on the second terminals. Extensions with free ends protrude from and are perpendicular to the first and second terminals in the same direction. Fixed terminal contacts are perpendicular to the given direction of the phase conductors. Intermediate pieces are disposed on the free ends of the extensions and are movable into contact with the fixed terminal contacts.

4 Claims, 2 Drawing Sheets

METAL-ENCAPSULATED SWITCHING APPARATUS

BACKGROUND OF THE INVENTION

1. Field of the Invention

The invention relates to a metal-encapsulated switching apparatus, including a housing having compartmental and/or support insulators at two opposite ends thereof. One of the insulators carries first terminals connected to phase conductors on one side and the other insulator carries second terminals connected to phase conductors on the opposite side. The terminals are parallel, spaced apart from each other and overlapped. The first terminals support movable contacts in the form of contact blades and the second terminals support fixed contacts.

2. Description of the Related Art

Such a switching apparatus has become known from European Published, Non-prosecuted Application No. 0 128 377. The switching apparatus or the part thereof which is shown, is only a disconnect switching apparatus which can be used in certain relationships of phase conductors relative to each other.

It is accordingly an object of the invention to provide a a metal-encapsulated switching apparatus, which overcomes the hereinafore-mentioned disadvantages of the heretoforeknown devices of this general type and to further improve the range of application and the flexibility of such a high-voltage switching apparatus.

With the foregoing and other objects in view there is provided, in accordance with the invention, a metal-encapsulated switching apparatus including a housing having first and second opposite ends, a first insulator disposed at the first end, and a second insulator disposed at the second end. First terminals are supported on the first insulator. First phase conductors run in a given direction and are connected to the first terminals. Second terminals are supported on the second insulator. Second phase conductors run in the given direction and are connected to the second terminals. The first and second terminals are mutually parallel, spaced apart and mutually overlapped. Movable contacts in the form of contact blades are supported on the first terminals. Fixed contacts are supported on the second terminals. Extensions with free ends protrude from and are perpendicular to the first and second terminals in the same direction. Fixed terminal contacts are perpendicular to the given direction of the phase conductors. Finally, intermediate pieces which are disposed on the free ends of the extensions are movable into contact with the fixed terminal contacts. The insulators may be compartmental and/or support insulators.

The following advantages are achieved with the invention: voltage transformers and other terminals can be connected to the housing which preferably contains the disconnect switch, through a simple modification. The modification can be readily achieved due to the feature that the individual components can be inserted or connected in any desired position, depending on the adjustment of the spacers.

In accordance with another feature of the invention, the extension protruding from the first terminals forms a hook-like L-shape with the first terminals. The extensions protruding from the second terminals are in the form of stubs formed on the second terminals and extending perpendicular thereto. Other contacts, which may be tulip shaped, are attached to the free ends of the extensions into which the intermediate pieces are plugged.

In accordance with a further feature of the invention, the intermediate pieces are crank shaped and can be aligned in different axial positions for connecting the fixed terminal contacts and the extensions to at least one of the terminals and the phase conductors connected thereto.

The crank-like spacers permit the relationship of the terminals to the terminal contacts to be provided in any desired mutual position. A distinctly increased variability of the switching apparatus according to the invention is therefore brought about; in particular, it is substantially easier to connect specific devices such as voltage transformers or further contacts carrying the rated current, to these external contact terminals.

In accordance with a concomitant feature of the invention, the intermediate pieces have first ends plugged into the other contacts and second ends opposite the first ends. Other insulators are transverse to the first-mentioned insulators, and connecting elements are formed on the second ends of the intermediate pieces at feedthroughs formed in the other insulators.

Other features which are considered as characteristic for the invention are set forth in the appended claims.

Although the invention is illustrated and described herein as embodied in a metal-encapsulated switching apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the single figure of the drawing.

DESCRIPTION OF THE PREFERRED EMBODIMENT

Figure 1:
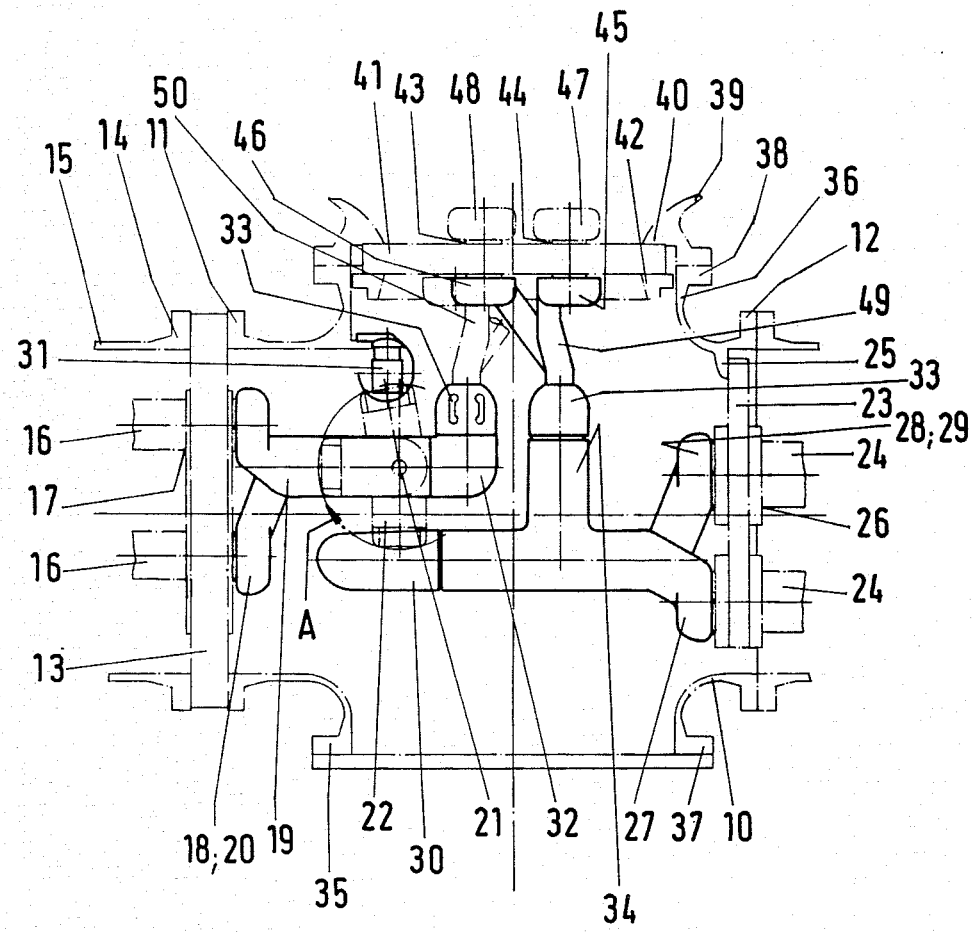
FIG. 1 is a longitudinal sectional view of a switching apparatus according to the invention.

Referring now to the figures of the drawing in detail, it is seen that the switching apparatus is formed of a housing 10 having a tubular shape and flanges 11 and 12 at opposite ends thereof. The flange 11 shown to the left in FIG. 1 is followed by a compartmental insulator 13, to which a flange 14 of an encapsulation housing 15 for phase conductors 16, is connected. The compartmental insulator 13 has feedthroughs 17 which correspond to the number of phase conductors 16 and which are followed within the compartmental insulator 13 by first terminals 18, as is also the case in European Published, Non-Prosecuted Application No. 0 128 377. The terminals 18 have a substantially L-shaped form, so that one leg 19 thereof extends parallel to the longitudinal axis of the phase conductors 16, while the other leg 20 thereof can be aligned perpendicularly thereto, since the other leg 20 establishes the connection to the feedthroughs 17. The length of the legs 20 is different and is matched to the distance between the central axes of the phase conductors 16 and the central axes of the legs 19. An insulating drive shaft 21 passes through the legs 19 which lie in one plane and each of which carries a contact blade 22 in the form of a movable contact, that is a movable contact of the disconnect switch located in the encapsulation 10.

A support insulator 23 which itself has no sealing function, but only serves for holding phase conductors 24, is connected to the right-hand end of the housing 10, i.e. to the flange 12. Therefore, the support insulator 23 is fastened to an inwardly-projecting extension 25 of the flange 12. The support insulator 23 also has feedthroughs 26. The feedthroughs 26 are connected to the phase conductors 24 at the right of the support insulator 23 and are connected to second terminals 27 at the left thereof. Similarly to the first terminals 18, the second terminals 27 have a substantially L-shaped form, with one leg 28 which extends parallel to the legs 19 and other legs 29 perpendicular thereto. The lengths of the legs are different, so that the legs 28 lying in one plane can be connected to the phase conductors 24 at the feedthroughs 26 disposed in a triangle. The legs 19 and 28 of the respective terminals 18 and 27 which run parallel to the phase conductors, are parallel to each other and overlap each other at a distance. In other words, each of the legs project from different sides of the housing beyond the end of the other leg. The free end of the leg 28 carries a fixed contact 30 which comes into contact with the contact blade 22 of each terminal, that serves as the movable contact.

At sides of the terminals 18 opposite the terminals 27 is a grounding contact 31 on the housing 10 for each phase which is contacted by the contact blades 22 if they are swung in the direction of an arrow A into the grounding position, in other words from an "on" position, in which the contact blade interconnects the two terminals 18 and 27, through an "off" position, in which the contact blade is within the contour of the legs 19, into the grounding position.

The free end of the leg 19 has an L-shaped angled-off portion 32 with a free end, to which a tulip contact 33*l* is attached, as shown in phantom. A tulip contact protrudes upwardly and has an open end, like a tulip. A stub 34 is formed at the leg 28 of each terminal 27. The free end of the stub 34 also has a tulip contact which corresponds to the tulip contact 33*l* and therefore has been given the reference numeral 33*r*. Reference symbols 33*l* and 33*r* refer to left and right tulip contacts. A tulip contact points upward like a tulip and has a hole formed therein for insertion of an intermediate contact to be discussed below. The contacts or tulip contacts 33 of the L-shaped angled-off portions as well as of the stubs 34 are spaced at the same height relative to the central axis of the housing 10 or at the same distance from the central axis and are located in a plane which extends parallel to the planes formed by the respective legs 19 and 28.

Figure 2:
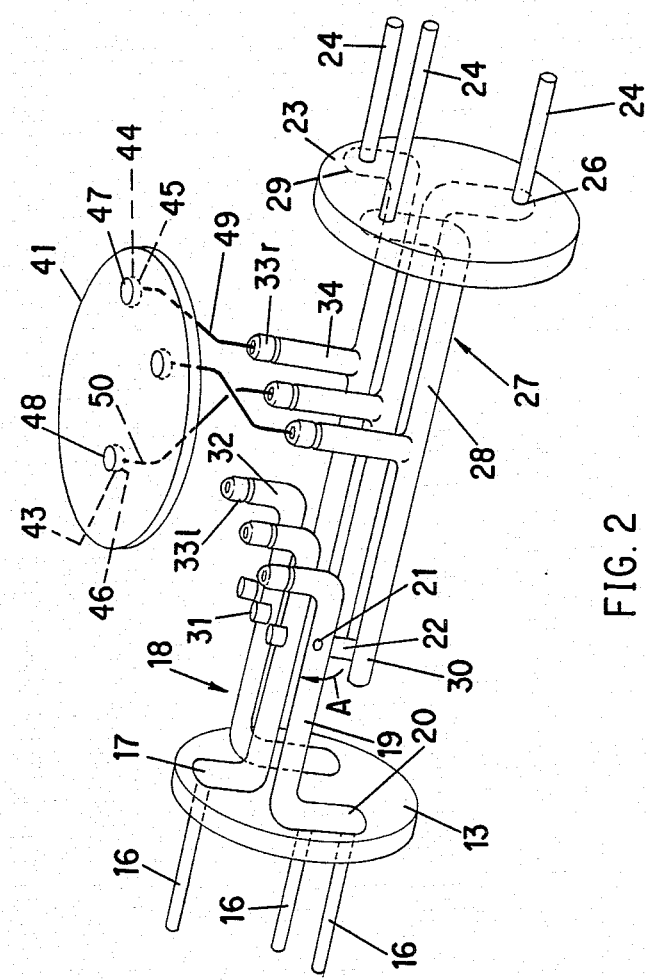
FIG. 2 is a fragmentary, perspective view of a portion of the device shown in FIG. 1, in which the housing and the contact blade have been omitted for clarity.

Housing stubs 35 and 36 are formed at the housing 10 transverse to the planes of the two flanges 11 and 12. The housing stubs 35 and 36 end in flanges 37 and 38. An attachment or terminal part 39 is fastened to the flange 38 which has a setback 40, against which a further compartmental insulator 41 is fastened by means of a flange ring 42. Respective feedthroughs 43 and 44 are provided for each phase in the compartmental insulator 41. Terminal contacts 45 and 46 are provided on the inside of the compartmental insulator 41, i.e. toward the tulip contacts 33. The terminals 45 and 46 have a corresponding structure in the form of further terminal contacts 47 and 48 on the outside of the compartmental insulator. The terminal contacts 45 and 46 are disposed at the compartmental insulator in such a way that air gaps and leakage paths are maintained in the vicinity of the compartmental insulator 41. The spacings between the terminal contacts 45 and 46 are smaller than the spacings between the phase conductors 16. Intermediate contacts 49 and 50 in the shape of cranks are plugged into the tulip contacts 33*r* and the terminal contacts 45 and 46. The intermediate contacts 49 and 50 may be removed from the tulip contacts 33*r* and inserted in the tulip contacts 33*l* so as to also permit the tulip contacts 33*l* to be connected to the respective terminals 47/45 and 48/46. The intermediate contacts 49, 50 in FIG. 2 are shown as lines, for the sake of clarity.

The intermediate contacts 49 and 50 are constructed in such a way that the terminal part 39 together with the compartmental insulator 41 or optionally the compartmental insulator 41 with the feedthroughs 43 and 44 alone can be attached in different positions. The compartmental insulator with the terminal part 39 or alone, may be replaced with another compartmental insulator having feedthroughs in different positions relative to the tulip contacts. This has advantages in attaching certain components with contacts in different locations to the flange 38. Preferably, a voltage transformer or contacts carrying the rated current will be added at that point.

The terminal contacts 47, 48 can be followed by contacts of a voltage transformer or conductor segments carrying the rated current. The crank-shaped intermediate contacts 49, 50 are of importance in this context. That is because the crank-shaped intermediate contacts are suited for establishing a connection between the contacts 33 and 45 or 46, respectively, in different and desired manners. The intermediate contacts 49 which are constructed in the form of cranks and are shown by solid lines in FIG. 1, connect the terminal contacts 33 to the contacts 46 and 45, while the intermediate contacts 50 which connect the contacts 33 associated with the left-hand phase conductors and therefore are formed at the L-shaped angled-off portions, are shown in phantom in FIG. 1. It only requires a removal and replacement of the crank-like intermediate pieces or intermediate contacts or a specific removal or replacement of the compartmental insulator attached thereto, to connect the corresponding phase conductors or terminal contacts to the corresponding compartmental insulator extending transversely thereto.

We claim:

1. Metal-encapsulated switching apparatus, comprising a housing having first and second opposite ends, a first insulator disposed at said first end, a second insulator disposed at said second end, first terminals supported on said first insulator, first phase conductors running in a given direction and being connected to said first terminals, second terminals supported on said second insulator, second phase conductors running in said given direction and being connected to said second terminals, said first and second terminals being mutually parallel, spaced apart and mutually overlapped, movable contacts in the form of contact blades supported on said first terminals, fixed contacts supported on said second terminals, extensions having free ends and protruding in the same direction from and being perpendicular to said first and second terminals, said extensions protruding from said first terminals forming L-shapes with said first terminals, said extensions protruding from said second terminals being in the form of stubs, tulip-shaped contacts attached to said free ends of said extensions, fixed terminal contacts in said housing perpendicular to said given direction of said first and second phase conductors, and crank-shaped intermediate pieces each being selectively plugged into a respective one of said tulip-shaped contacts of one of said first and second terminals and each being selectively plugged into a respective one of said fixed terminal contacts, for electrical connecting said extensions of either of said first and second terminals to said fixed terminal contacts.

2. Switching apparatus according to claim 1, wherein said first insulator is in the form of a compartmental insulator and said second insulator is in the form of a support insulator.

3. Switching apparatus according to claim 1, wherein said first insulator is in the form of a compartmental insulator.

4. Switching apparatus according to claim 1, wherein said second insulator is in the form of a support insulator.

* * * * *